United States Patent
Baek et al.

(10) Patent No.: US 8,250,156 B2
(45) Date of Patent: Aug. 21, 2012

(54) METHOD AND SYSTEM FOR PROVIDING ADDITIONAL INFORMATION RELATED TO CONTENT OF AN E-MAIL

(75) Inventors: Chang Yol Baek, Seoul (KR); Jee Sook Lee, Gyeonggi-do (KR); Han Byeol Choi, Seoul (KR)

(73) Assignee: NHN Corporation, Seongnam-si (KR)

( * ) Notice: Subject to any disclaimer, the term of this patent is extended or adjusted under 35 U.S.C. 154(b) by 152 days.

(21) Appl. No.: 12/133,415

(22) Filed: Jun. 5, 2008

(65) Prior Publication Data

US 2008/0307046 A1 Dec. 11, 2008

(30) Foreign Application Priority Data

Jun. 8, 2007 (KR) ........................ 10-2007-0055788

(51) Int. Cl.
G06F 15/16 (2006.01)
G06F 15/173 (2006.01)
G06F 15/177 (2006.01)

(52) U.S. Cl. ..................................... 709/206
(58) Field of Classification Search .................... 709/206
See application file for complete search history.

(56) References Cited

U.S. PATENT DOCUMENTS

| | | | | |
|---|---|---|---|---|
| 5,946,647 A * | 8/1999 | Miller et al. | ........................ | 704/9 |
| 6,799,300 B1 * | 9/2004 | Hishida et al. | ................. | 715/236 |
| 7,257,585 B2 * | 8/2007 | Stevenson et al. | ............ | 707/809 |
| 7,451,099 B2 * | 11/2008 | Henkin et al. | .............. | 705/14.54 |
| 7,711,550 B1 * | 5/2010 | Feinberg et al. | ................... | 704/9 |
| 7,853,558 B2 * | 12/2010 | Brindley | ........................ | 707/608 |
| 2003/0093483 A1 * | 5/2003 | Allen et al. | .................... | 709/207 |
| 2005/0177805 A1 * | 8/2005 | Lynch et al. | ................... | 715/968 |
| 2005/0289113 A1 * | 12/2005 | Bookstaff | .......................... | 707/1 |
| 2006/0020615 A1 * | 1/2006 | Keohane et al. | .............. | 707/101 |

(Continued)

FOREIGN PATENT DOCUMENTS

JP 2004-094715 3/2004

(Continued)

OTHER PUBLICATIONS

Zimbra, Zimlets—A mechanism for Integrating Disparate Information Systems and Content with the Zimbra Collaboration Suite (ZCS), Jan. 31, 2006, Retrieved from http://files.zimbra.com/website/docs/Zimbra%20Zimlets%20Whitepaper.pdf, pp. 1-40.*

(Continued)

*Primary Examiner* — Haresh N Patel
*Assistant Examiner* — Chau Le
(74) *Attorney, Agent, or Firm* — H.C. Park & Associates, PLC

(57) ABSTRACT

A method of providing additional information related to content of an e-mail is disclosed. The method includes receiving emails for a user: analyzing content of such a received email and identifying an information type of one or more strings in the content based, at least in part, upon predetermined information patterns; searching additional information related to basic information associated with a string in accordance with the identified information type; and displaying the additional information in response to receiving a user-initiated selection. The present invention is a method and system for providing additional information related to content of an e-mail such that the user can obtain additional information related to content of an e-mail without leaving the web page showing the email.

19 Claims, 8 Drawing Sheets

U.S. PATENT DOCUMENTS

2007/0157245 A1* 7/2007 Collins .......................... 725/46
2010/0211463 A1* 8/2010 Black et al. ................. 705/14.52

FOREIGN PATENT DOCUMENTS

| | | |
|---|---|---|
| JP | 2004-334305 | 11/2004 |
| JP | 2005-182543 | 7/2005 |
| JP | 2005-190367 | 7/2005 |
| JP | 2006-65494 | 3/2006 |

OTHER PUBLICATIONS

Kamiya Akinori, "It is important to take care of the details to make a good website. 55 ideas of design parts coloring a website", Jul. 1, 2006, p. 62, vol. 55, MdN Corporation, Japan.

Furuhata Kazuhiro, "Getting started with Ajax", Jan. 1, 2007, p. 142-145, vol. 7 No. 1, Mainichi Communications Inc., Japan.

* cited by examiner

METHOD AND SYSTEM FOR PROVIDING ADDITIONAL INFORMATION RELATED TO CONTENT OF AN E-MAIL

CROSS-REFERENCE TO RELATED APPLICATION

This application claims the benefit of Korean Patent Application No. 10-2007-0055788, filed on Jun. 8, 2007, in the Korean Intellectual Property Office, the disclosure of which is incorporated herein by reference in its entirety for all purpose.

BACKGROUND OF THE INVENTION

The present invention relates to a method and system for providing additional information service onto e-mail in response to receiving a user-initiated selection, more particularly to a method and system for providing additional information service onto e-mail where the information pattern of a predetermined string of the content of a received e-mail is automatically recognized, and the additional information related with the string can be provided to the user along with the content (basic information) of the e-mail by a simple operation, so the user can conveniently use the e-mail service.

Email system facilitates the exchange of electronic mails over a network, such as a LAN (local area network), WAN (wide area network), or public network (e.g., Internet). FIG. 1 illustrates an exemplary screen display of a web page for providing a conventional e-mail service. The conventional e-mail service only provides content of an e-mail that is written by a sender. However, a recipient sometimes wants to obtain additional information related to some text or graphical items included in the content. For example, when the text of the e-mail includes a person's name or company name, if the user wants to check the related information (e.g., the person's address, phone number, e-mail address, etc.), he would have to find the information by executing a separate address list program, operating a PDA, or using other ways.

Especially, if a person receives a meeting or business-related e-mail wherein names or phone numbers are included, it might take significant time for him to search related information about each name or each phone number, that is additional contact information for the each person or the each phone number.

Generally, a portal website having an e-mail service provides an online service for searching an address list. However, where the user searches the related information using an external service or separately implementing program, it is still inconvenient because the user should temporarily leave the web page showing the email and move to the service page or a search screen, and search the name or the phone number one by one, and while frequently changing the screen, requesting a separate service, and executing a separate program, the efficiency of computer resources or network resources manage is lowered, which is problematic.

It is therefore desirable to provide a method and system for providing additional information related to content of an e-mail without leaving the web page showing the email.

Specific advantages and features of the invention will be apparent from the attached drawings and description of an illustrative embodiment of the invention.

SUMMARY OF THE INVENTION

An object of the present invention is to provide a method and system for providing additional information service onto e-mail in which a string having a predetermined pattern in the text of a received e-mail is automatically recognized, and simple additional information related with the string is found and provided to a user.

Another object of the present invention is to provide a method and system for providing additional information service onto e-mail in which when a certain string is indicated by an input means such as a mouse, the string-related additional information can be promptly shown in the screen, so it is possible for the additional information to be conveniently and efficiently provided to the user.

Another object of the present invention is to provide a method and system for providing additional information service onto e-mail in which when the additional information related with the information included in the content of an e-mail is displayed, the format of the e-mail is automatically changed to secure the space of the additional information, or a separate window is provided for the information, so the additional information can be conveniently and efficiently provided without hindering use of a general e-mail service.

Another object of the present invention is to provide a method and system for providing additional information service onto e-mail in which when obtaining useful additional information related with the information included in an e-mail, the working time for searching the address list can be significantly reduced, and several steps that have been required are minimized, so it is easy for a user to obtain such information quickly, and the efficiency of resources distribution increases because more computer resources and network resources can be distributed to other works.

In order to accomplish the above objects, the present invention provides method of: receiving emails for a user: analyzing content of such a received email and identifying an information type of one or more strings in the content based, at least in part, upon predetermined information patterns; searching additional information related to basic information associated with a string in accordance with the identified information type; and displaying the additional information in response to receiving a user-initiated selection. The basic information being at least a portion of the content of the received email.

Here, the method further comprises determining the additional information according to the analyzed information pattern; and linking the determined additional information with the basic information.

In the step of linking the additional information with the basic information, the additional information is linked with the basic information by linking the additional information with the string included in the basic information.

Also, linking the additional information with the basic information enables the additional information linked with the string included in the information region to be displayed in the user terminal when the information region is indicated.

Also, linking the additional information with the basic information enables the additional information linked with the string included in the information region to be displayed in the user terminal when the information region is indicated by automatically changing a format of the basic information.

Further, linking the additional information with the basic information enables the additional information linked with the string included in the information region through a separate window to be displayed in the user terminal when the information region is indicated.

Also, the step of providing the basic information and the additional information comprises providing the basic information to the user terminal and providing the additional information to the user terminal when the indication of the information region including the string is recognized in the user terminal.

Also, in the step of analyzing the information pattern, one or more strings included in the basic information is analyzed to determine whether there is a string of a predetermined pattern, and in the step of determining the additional information, if there is a string of the predetermined pattern, the additional information for the string of the predetermined pattern is searched.

Also, in the step of analyzing the information pattern, it is determined whether the one or more strings belong to a certain information pattern, and the information pattern comprises at least one of a name/title, unit, market information, e-mail address, phone number, location information such as an address, and time/date information pattern.

Further, in the event that a multiple additional information related to one of the basic information are searched, the present invention includes the steps of selecting at least one additional information based upon prior selections made by the user or a sender of the received email; and displaying at least a portion of the selected additional information.

Another aspect of the present invention provides a method of providing an additional information service onto an e-mail, which comprises receiving via a network an email including basic information associated with at least one string included in a body of the email, and additional information related to the basic information associated with each of the at least one string from a server; detecting a user-initiated selection of a string included in the body of the received email; and in response to receiving the user-initiated selection, displaying the additional information related to the basic information associated with the selected string.

Another aspect of the present invention provides a system for providing an additional information service onto an e-mail, which comprises a pattern-recognition module for analyzing content of an email and identifying an information type of one or more strings in the content based, at least in part, upon predetermined information patterns; an information-search module for searching additional information related to basic information associated with a string in accordance with the identified information type; and a server-control module for providing the additional information.

DETAILED DESCRIPTION OF THE PREFERRED EMBODIMENTS

Figure 1:
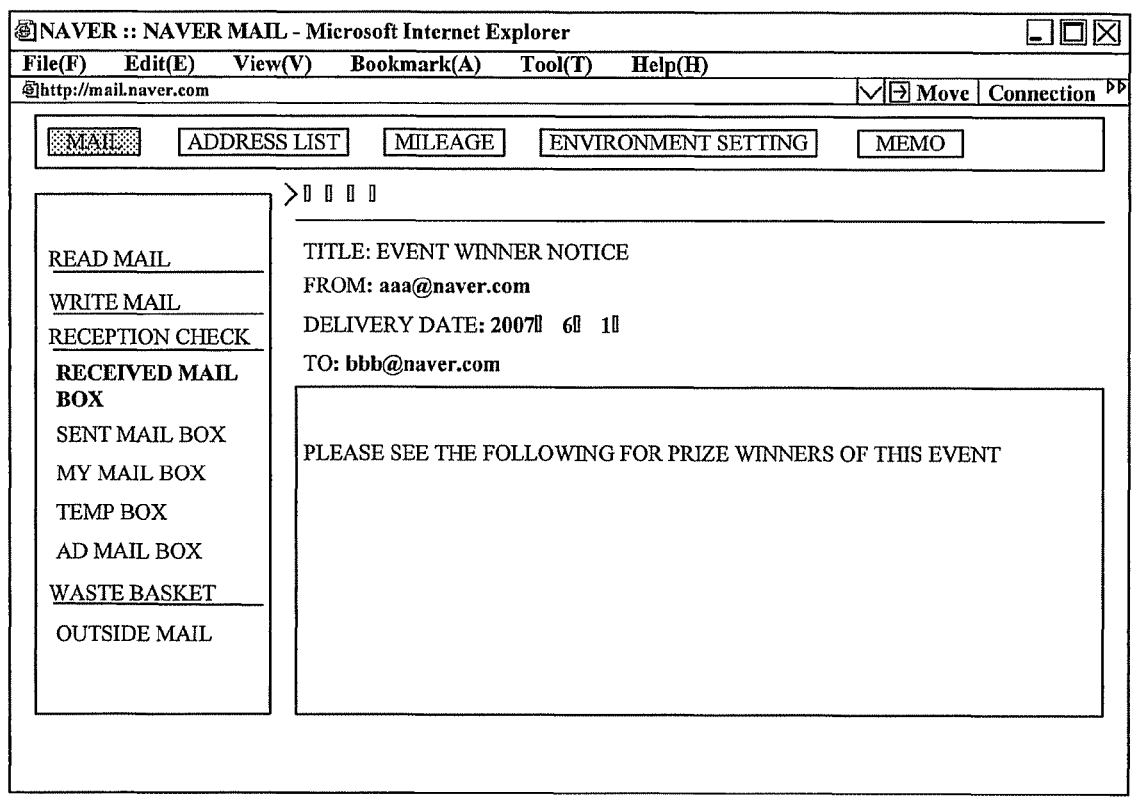
FIG. 1 illustrates a screen of providing a general e-mail service.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
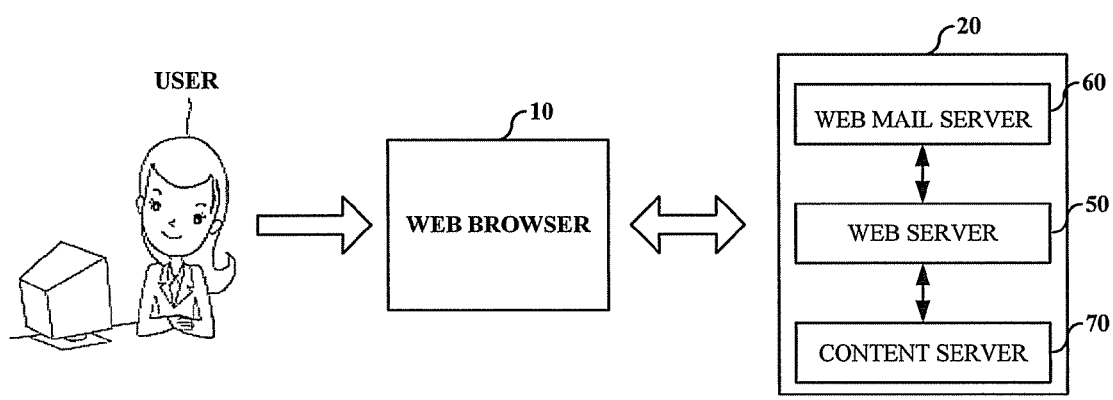
FIG. 2 illustrates the configuration of a system for providing an additional information service onto e-mail according to an exemplary embodiment of the present invention.

FIG. 2 illustrates the configuration of a system for providing an additional information service onto e-mail according to an exemplary embodiment of the present invention.

Referring to FIG. 2, the system for providing an additional information service onto e-mail of the present invention can have access to a browser 10 mounted on a user terminal through a network, wherein the system may include a web server 50 and an e-mail server 60.

The user terminal where the browser 10 is executed is a device that can connect to Internet network, and search, output and store information according to manipulation of a predetermined input means such as a keyboard, a mouse and a touch pad. Some examples of the user terminal are a general computer such as a desktop computer and a notebook computer, other devices where information networking is possible in a ubiquitous environment, and a mobile device such as a PDA and a mobile phone.

The e-mail server 60 implements a web page for providing an e-mail service to a registered user, provides an e-mail account of a certain capacity, and provides the user with e-mails sent or received through the allocated account.

The web server 50 transmits data that constitute the web site so that the e-mail service can be provided through the browser 10, and transmits the related data according to the user's request transmitted from the browser 10.

Further, the system for providing the additional information system onto e-mail according to the present invention searches additional information related with predetermined information included in the request message in accordance with the request message from the e-mail server 60 or the web server 50, and can further include a content server 70 that transmits the search result to the e-mail server 60 or the web server 50.

The content server 70 can be linked with a server for additional services such as an address list service, a location-based service, a time/date-based service and a knowledge-providing service, or can be implemented in the form of an additional service server, so it is possible for directly or indirectly accessible various databases to be referred and for the information to be searched and provided.

The system for providing the e-mail service according to the present invention may be implemented in the form of a portal server 20 that includes the e-mail server 60, the web server 50 and the content server 70. The portal server 20 can provide many and unspecified persons or registered users with several services such as a search service, an e-mail service, a chatting service, a club service, a text message service, a shopping mall service, a game service and a blog service integrally by including all of the above-mentioned servers and by being connected to each sever through network, and transmitting and receiving data.

Based on the above-mentioned network infrastructure and the various modified environments, the web server 50 of the embodiment analyzes the information pattern by determining whether there is any string corresponding to a predetermined information pattern after analyzing basic information of an e-mail (content of an e-mail) for the e-mail provided to a user, by checking each string whether it corresponds to a predetermined information pattern, or according to other modified algorithms.

The information pattern is used for providing related information that can be useful when the user refers to received e-mails, and there can be various items such as a name/title, a unit, market information, an e-mail address, a phone number, location information such as an address and time/date information. Further, the types of the related additional information that can be provided through a search according to each classified pattern can vary depending on the setting, and some examples of the types are an address list, weather information, the exchange rate, a news article, fortune information, person search information, stock price information, book information and URL.

Hence, various types of additional information can be searched for a string that belongs to one of the information patterns. Here, it is possible to provide various types of additional information in parallel so that the user can selectively refer to the information. Further, after analyzing the user's disposition including the frequency of types of content provided through the web server, it is possible to provide high-ranking items by selecting additional information corresponding to the content types of high frequency among the searched types of additional information.

The analysis of the information pattern and providing of the corresponding additional information can be set to be provided only when requested by the e-mail sender or receiver, or the types of the information pattern included in the analysis can be set to be specified by the sender or receiver.

The additional information according to the obtained information pattern is provided to the user's terminal when the user refers to the basic information of an e-mail using the terminal. Here, in order not to hinder the reading of the basic information, it may be desirable for the additional information to be shown when the information region including the string is indicated instead of showing the additional information continuously.

For example, if a certain person's name is written in an e-mail, when a region around the text is indicated by the mouse, it is possible to show the search result of the address list, for example, the phone number, the e-mail address, the occupation and the address. Further, it is possible to show the information on the screen using secured space by changing the basic information format of the e-mail service or using a separate window. Detailed description of the operation will be described in the following using an exemplary embodiment, so the description is omitted here.

Figure 3:
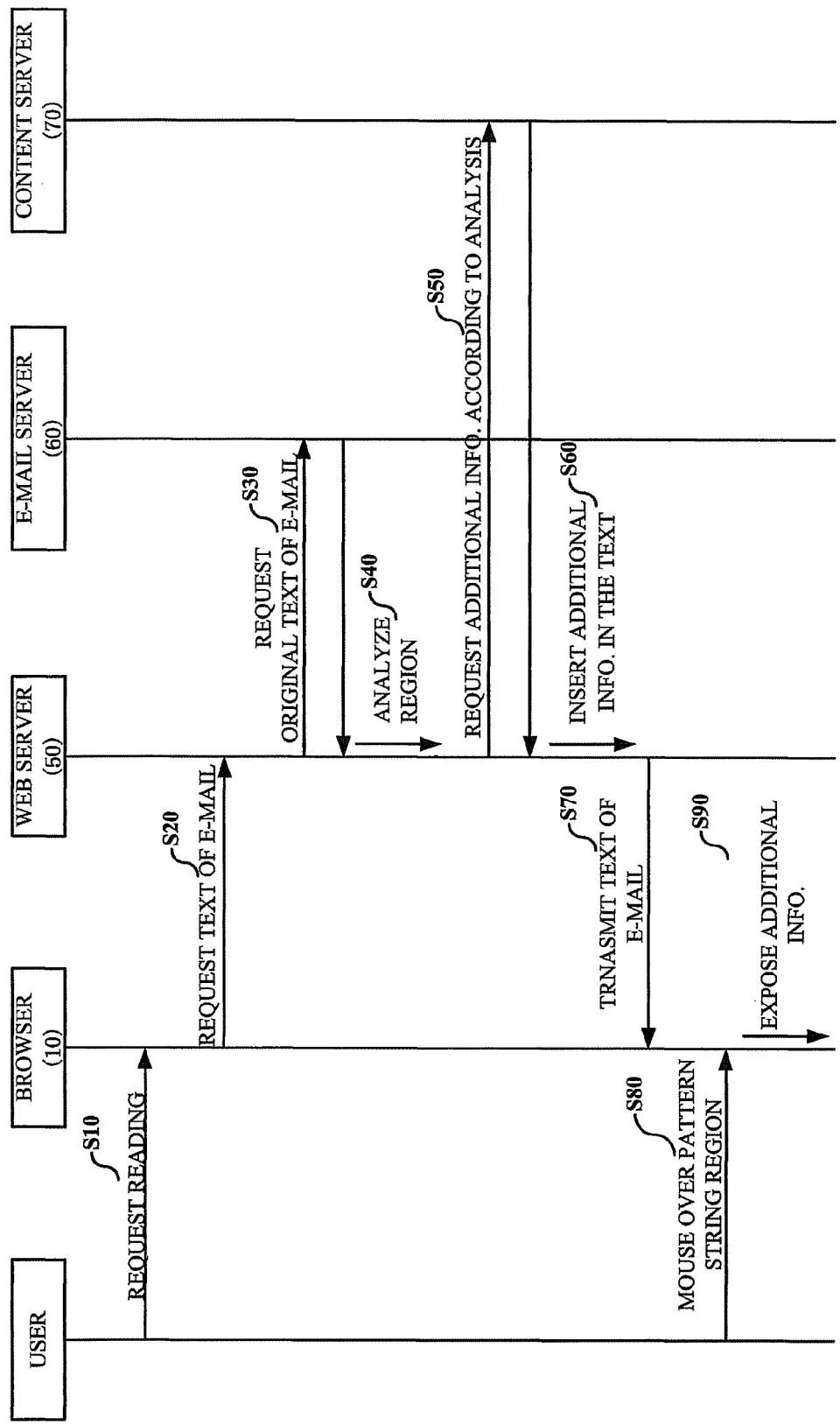
FIG. 3 is a flowchart illustrating a method of providing an additional information service onto e-mail according to an exemplary embodiment of the present invention.

FIG. 3 is a flowchart illustrating a method of providing an additional information service onto e-mail according to an exemplary embodiment of the present invention. Referring to FIG. 3, when one of the displayed received e-mails is selected by an input means such as a mouse, a keyboard, a touch pan or a touch pad in step S10, the browser 10 can generate a text-request message of the selected e-mail, and send the message to the web server 50 in step S20.

In step S30, the web server 50 reads the received text-request message, and sends a request for the original content of the e-mail to the e-mail server 60, and the e-mail server 60 searches the e-mail corresponding to the request message, and transmits the original text of the searched e-mail to the web server 50.

In step S40, the web server 50 analyzes text data of the content of the e-mail received from the e-mail server 60, determines whether some of the strings that constitute the text data can be classified as a predetermined information pattern, and classifies the corresponding strings according to each pattern.

Specific examples of classification algorithms by information patterns can vary. For example, if two to four consonants and vowels of Korean letters or two to four Chinese characters are consecutively arranged, or the first alphabet out of multiple alphabets arranged right and left based on the space is a capital letter, the string can be classified as having an information pattern corresponding to "Name."

As another example, in the case where a multiple of numbers are connected by two or three hyphens, or a string is a combination of a multiple or numbers and letters, if the string includes at least one of "year", "month" and "day", and at least one number is arranged before the word, the string can be classified as having an information pattern corresponding to "Date."

In the string where a multiple of numbers are connected by two or three hyphens, if the string is started with the number of "010", "011", "016" or "019", the string can be classified as having an information pattern corresponding to "Phone number".

Also, if there is a symbol "@" between multiple letters, and at least one "." is included in letters following "@", the string can be classified as having the information pattern of "e-mail address."

Likewise, if there is at least one of the strings classified according to the information pattern, in step S50, the web server 50 transmits each string and the corresponding information pattern to the content server 70 to request additional information related with each string, and the content server 70 searches additional information related with the requested string with reference to the information pattern item, and the search result data to the web server 50.

For example, while analyzing the text of an e-mail, the string "Hong, Gil-Dong" is classified as the information pattern of "Name", and the data is transmitted to the content server 70. The content server 70 recognizes that there is a need for additional information corresponding to the information pattern of "Name" through the received data, and searches data corresponding to "Hong, Gil-Dong" from the content server 70 or the address list database of the linked additional service server. If there is any related information such as the person's e-mail address, mobile phone number and address, the content server 70 transmits the information to the web server 50.

Next, in step S60, the web server 50 includes the additional information data received from the content server 70 in the basic information data of the e-mail. Here, it may be desirable for the additional information data included in the basic information data of the e-mail to be included in the hid format within the text of the e-mail so that the additional information does not hinder the reading of the basic information of the e-mail.

In step S70, the web server 50 transmits the text data of the e-mail including the additional information data to the web browser, and the web browser displays the content of the e-mail on the screen in such a manner that the additional information data is not shown.

Further, in step S80, while the user reads the content of the e-mail displayed on the browser, if a pointer (or another user interface means such as a cursor) outputted on the terminal screen is positioned in the information region related with the string of the predetermined pattern, in step S90, the browser 10 recognizes that the pointer is positioned in the region, and displays the additional information that has been hid.

In step S40, if the name "Hong, Gil-Dong" is searched and a multiple of persons of the name are found in the address list, all found data may be displayed, or the first found data may be displayed and it may be implied that there is more data by indicting a mark for additional data so that the user may choose to read the additional data. Here, the frequency of access to data may be referred.

Here, the web server 50 can allow the additional information to be outputted in a pop-up format in an appropriate position to be outputted right after the string of the text of the e-mail if the amount of the additional information is not much by automatically changing the basic information format of the e-mail. Also, various other separate window formats such as a pop-up window, a layer and a balloon can be used using related technologies such as HTML tag, JavaScript and CSS (Cascaded Style Sheet) code.

Figure 4:
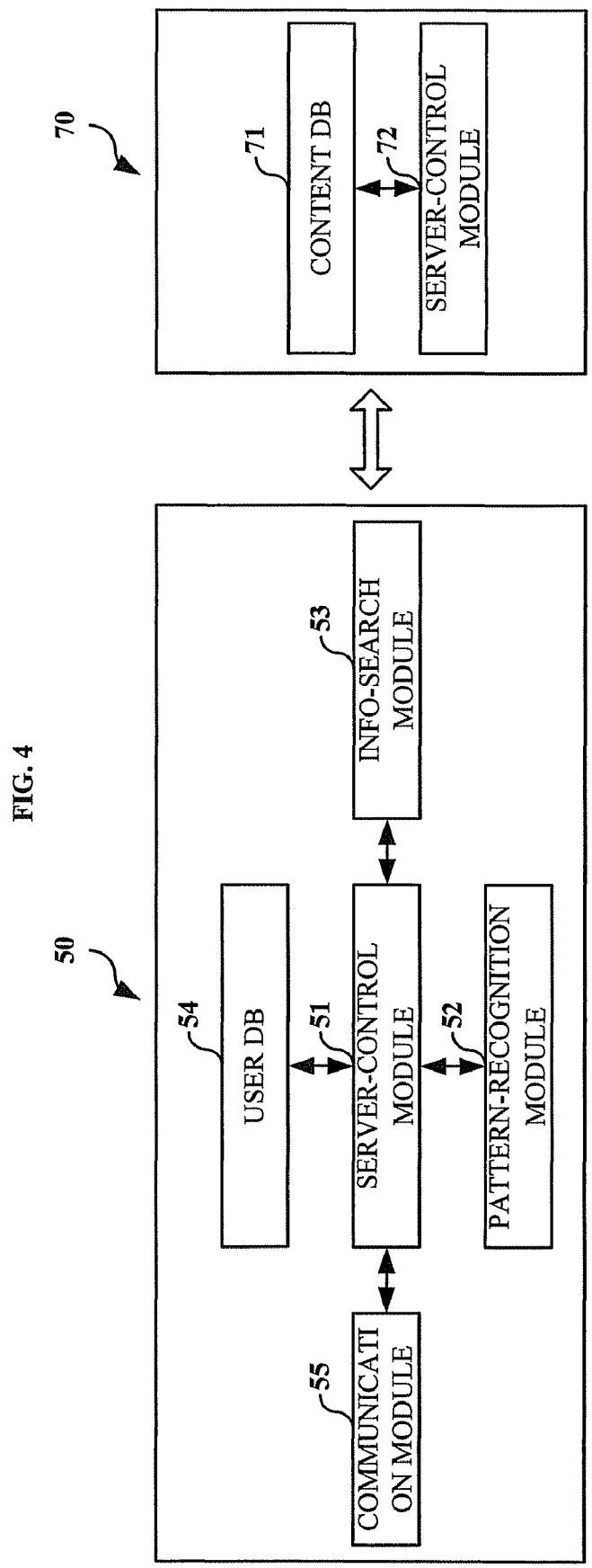
FIG. 4 is a block diagram illustrating a configuration of a web server in a system for providing an additional information system onto e-mail according to an exemplary embodiment of the present invention.

FIG. 4 is a block diagram illustrating a configuration of a web server in a system for providing an additional information system onto e-mail according to an exemplary embodiment of the present invention. The web server used in the embodiment can include a server-control module 51, a pattern-recognition module 52 and an information-search module 53, and can further include a user database 54 and a communication module 55.

The server-control module 51 controls general operation of the web server 50, and if the user terminal is connected to the web server 50 through the browser 10, the server-control module 51 transmits a main web page that includes a service list available in the web server 50 to the user terminal. Further, in the case where the user intends to use a service that requires user authentication, the user authentication data is received from the browser, and it is determined whether the received authentication data coincides with the registered user data.

Especially, in using an e-mail service, the server-control module 51 transmits the list of the received e-mails to the browser, and if one of the letters is selected, and a request for the content of the selected letter is received, the server-control module 51 requests the content of the e-mail to the e-mail server 60, and receives the content. Further, if the additional information is received for a predetermined string included in the e-mail, the server-control module 51 transmits the data to the browser 10 along with the content of the e-mail.

Here, it may be desirable for the additional information data included in the basic information data of the e-mail to be included in the hid format within the text of the e-mail so that the additional information does not hinder the reading of the basic information of the e-mail. That is, when the content data of e-mail is transmitted to the browser 10 and the content data is displayed on the browser, the additional information is not shown. Meanwhile, when the pointer on the browser is positioned at the predetermined string, the additional information is displayed on the browser. As mentioned above, the displayed additional information may be displayed in various types through the use of related technologies applicable to the browser.

The pattern-recognition module 52 analyzes at least one of the strings that constitute the content of the e-mail transmitted through the server-control module 51, and determines whether the string can be classified as a predetermined information pattern. In this case, various analyzing methods such as analyzing by recognizing morphemes that constitute each string using a morpheme analyzer or analyzing ASCII code corresponding to each letter may be used, and the methods may be applied in various manners depending on the intention of the e-mail service provider of the present invention.

The pattern-recognition module 52 classifies the analyzed strings according to the information pattern. As described above, the information patterns can be classified as Name/Title, Phone number, E-mail address, Address, Time/Date, etc., and the types of the related content can be selected according to the classified information pattern.

For example, in the case of a string recognized as the information pattern "Date", the related additional information may include the weather, the calendar, exchange rate information, traffic information, stock price information, etc. Here, if all the searched additional information is included in the content of the selected e-mail, the amount of data transferred increases, by which it may take significant time in transferring data and in processing the data in order to output the data. Hence, it may be desirable for the user to choose desired types of information so that only the selected information is included in the content of the selected e-mail.

Hence, if a multiple of sets of related additional information for the string corresponding to a predetermined information pattern are searched, the pattern-recognition module 52 analyzes the frequency of the content used, selects the content type of high frequency, transmits the string of the information pattern and the data of the selected content type to the information-search module 53 so that the additional information may be searched according to the selected content type in the information-search module 53.

The information-search module 53 searches the string of a predetermined pattern transmitted from the pattern-recognition module 52, and if the content type data is received along with the string of a predetermined pattern, the information related with the string is searched for the content type.

Here, the content database may be included in the web server 50, or if the database is built in a separate form of a content server 70, which is a network server, the information-search module 53 generates a message to request a data search, transmits the message to the content server 70, and the related information received from the content server 70 is transmitted to the server-control module 51. Here, the content server 70 can include a content database 71 where a great amount of content that can be provided through the web server 50 is stored, and a server-control module 72 that reads the request message received from the information-search module 53, searches the string included in the message according to the content type, and transmits the search result to the web server 50. Various types of content can be integrally stored in the content database (DB) 71, or the content DB 71 may establish a separate sub database by types. Here, if the provider is different according to the content type, the related information can be provided as a multiple of content servers are linked with the web server.

Further, the web server 50 includes personal information of registered users, a user DB 54 that stores user profile such as service-related data for each user, and a communication module 55 that converts data so that the data can be transmitted and received through network.

Figure 5:
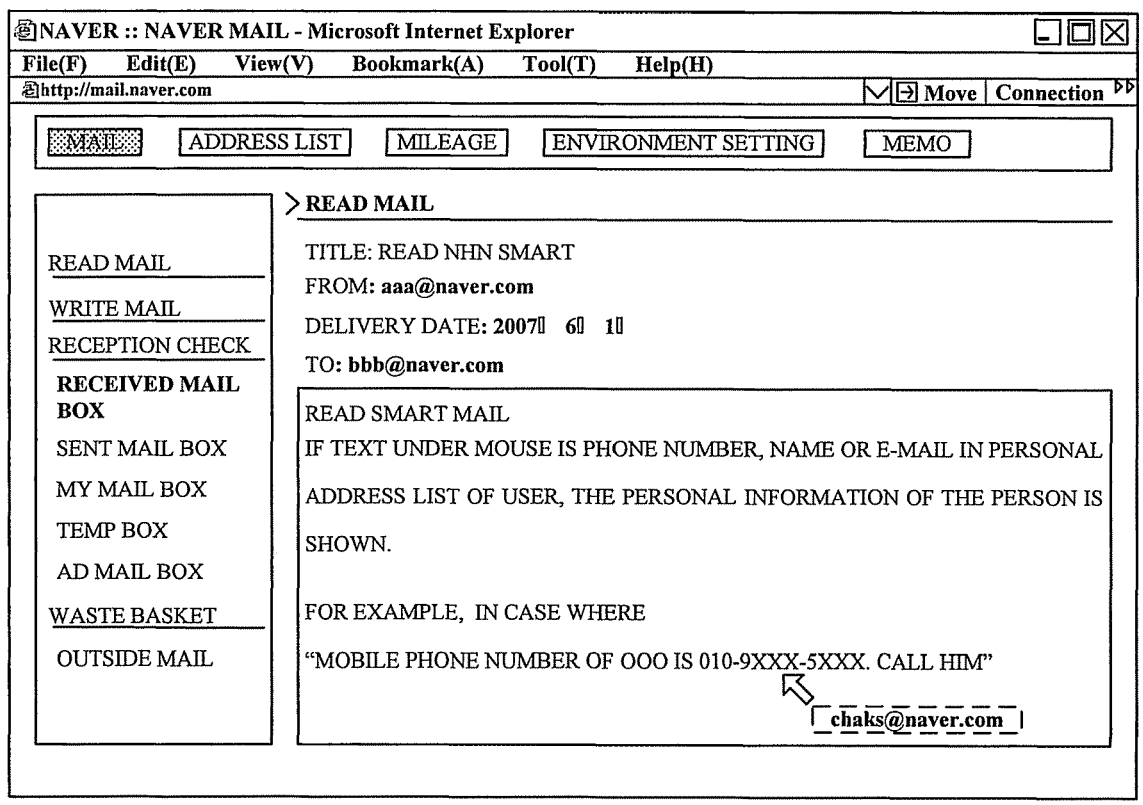
FIG. 5 illustrates a screen of providing an e-mail service shown on a terminal according to an exemplary embodiment of the present invention.

FIG. 5 illustrates a screen of providing an e-mail service shown on a terminal according to an exemplary embodiment of the present invention. If one of the received e-mails is selected in a browser 10 connected to Internet, the content of the selected e-mail is shown as illustrated in FIG. 5. Here, when a pointer (or another means to indicate the position in the screen such as a cursor) such as a mouse is positioned in the region where a phone number string is positioned, a pop-up window arranged adjacent to the pointer is outputted. The pop-up window has been transmitted along with the text of the e-mail after the phone number string was automatically recognized in the web server, and the related information was received from the content server 70. It is desirable for the pop-up window to be shown only when the pointer is positioned in the phone number string in order not to hinder the reading of the e-mail. The illustrated drawing shows a case where an e-mail address is shown through a separate window if the region is indicated when a mobile phone number of a certain person is shown in the text of an e-mail.

Figure 6A:
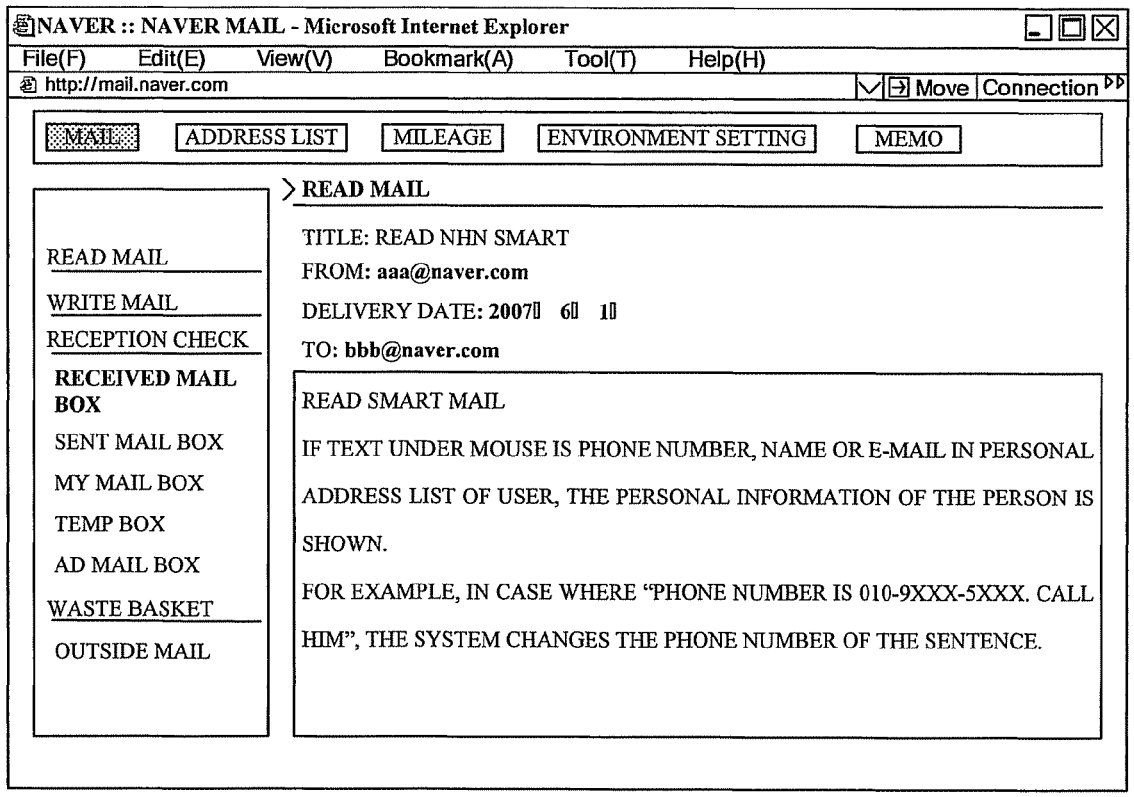
FIG. 6 illustrates a screen of providing an e-mail service shown on a terminal according to an exemplary embodiment of the present invention.
Figure 6B:
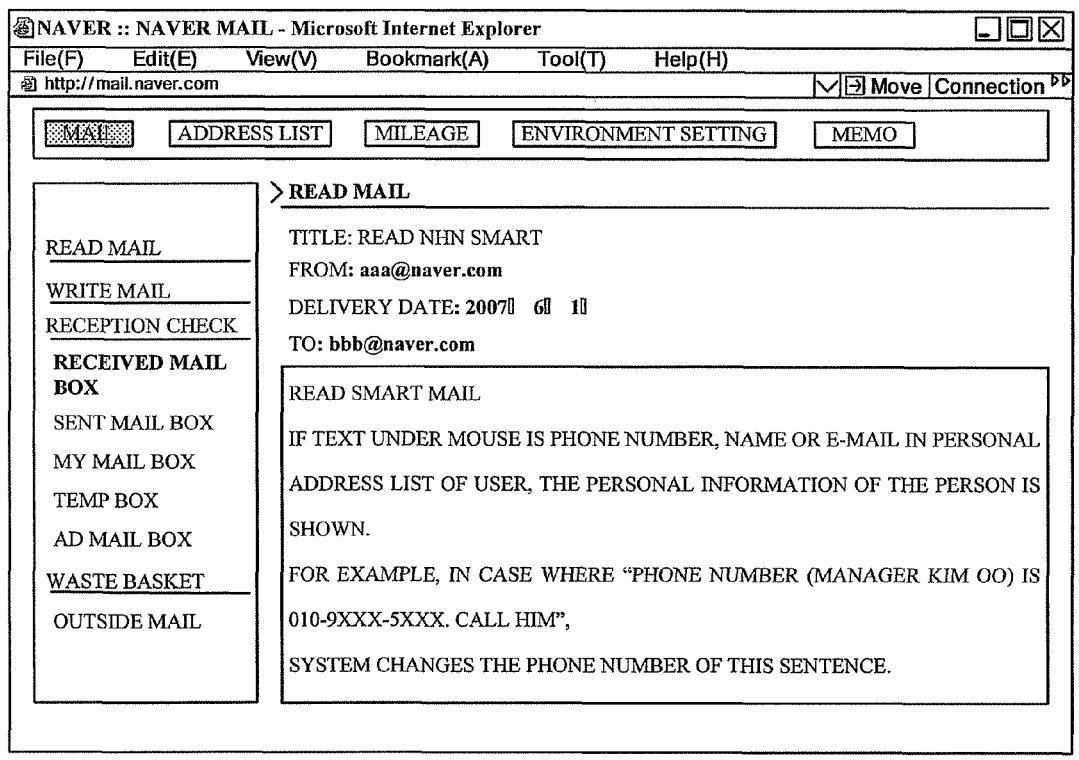

FIG. 6 illustrates a screen of providing an e-mail service shown on a terminal according to an exemplary embodiment of the present invention, FIG. 6A illustrates a screen right after the text of the selected e-mail is outputted, and FIG. 6B illustrates a screen where the related information is inserted to a phone number string if a pointer is positioned in the string.

Referring to FIG. 6A, if one of the received e-mails is selected, the content of the selected e-mail is outputted. Here, the text of the outputted e-mail includes the additional information transmitted from the web server 50, but the additional information is not yet shown.

While the user reads the text, if the user positions the pointer in the string recognized as a phone number pattern, as illustrated in FIG. 6B, the format of the basic information of the e-mail is automatically changed, and the additional information is inserted in the space secured by the change of the format, so there is a change in the content of the outputted e-mail shown in the screen.

Here, the string recognized as "Name" information pattern or "Phone number" information includes different types of related information, information additional information such as the name may be outputted in such a manner that the information is inserted in the text, and the additional information with large amount such as a phone number or an e-mail address may be outputted on the screen as a separate format such as a pop-up window.

Figure 7:
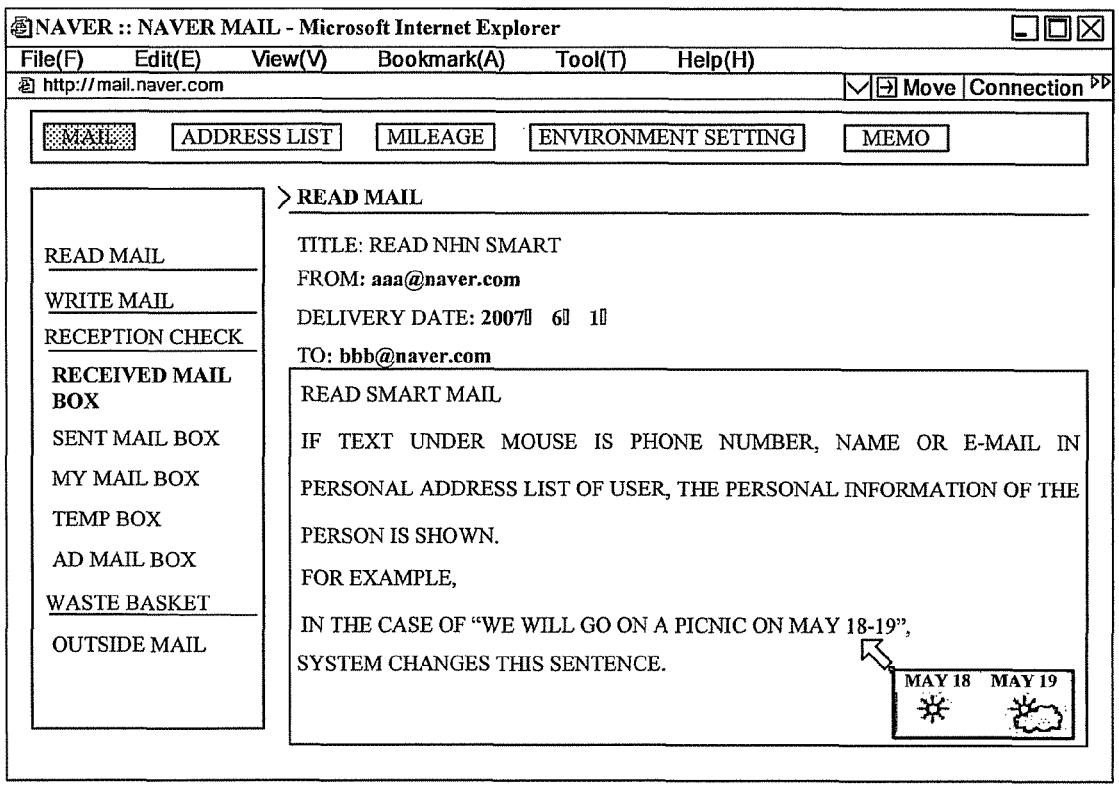
FIG. 7 illustrates a screen of providing an e-mail service shown on a terminal according to an exemplary embodiment of the present invention.

FIG. 7 illustrates a screen of providing an e-mail service shown on a terminal according to an exemplary embodiment of the present invention. Here, a screen of providing an e-mail service in the case of a string recognized as a date pattern is illustrated here. Referring to FIG. 7, before the text of the selected e-mail is outputted, the web server 50 receives the text data of the e-mail transmitted from the e-mail server 60, and determines whether there is a string of a predetermined information pattern. As a result, if there is a string having "Date" information pattern, the web server 50 sends a request for weather information of the date corresponding to the string to the content sever 70 in order to obtain weather information data. The content server 70 transmits the weather information data received from the weather information database to the web server 50, and the web server 50 transmits the received weather information data and the text of the received e-mail to the terminal. The browser 10 outputs the text data of the received e-mail on the screen, and the enclosed weather information data is hid while being connected to the "Date" pattern string of the text of the e-mail. While user reads the text, if the pointer is positioned at the date pattern string, the weather information data may be outputted in the browser as a separate format such as a pop-up window.

The accompanying drawings and the detailed description are to only describe embodiments of the present invention, and the scope of the present invention is not limited thereto. Therefore, those who skilled in the art will understand that many changes and equivalent embodiments can be made without departing from the spirit and aspect of the present invention. Thus, the scope of the present invention is be determined by the accompanying claims.

For example, the method for providing the additional information service can be implemented in various program types executed by various computer means. In this case, the program to execute the method for providing the additional information service is stored in recording media readable by the computer, for example, hard-disc, CD-ROM, DVD, ROM, RAM or flash memory.

According to a method and system for additional information service onto e-mail, a string having a predetermined pattern in the text of a received e-mail is automatically recognized, and simple additional information related with the string is found and provided to a user, so the user can utilize the e-mail service conveniently and widely.

Also, according to the present invention, when a certain string is indicated by an input means such as a mouse, the string-related additional information can be promptly shown in the screen, so it is possible for the additional information to be conveniently and efficiently provided to the user.

Also, according to the present invention, when the additional information related with the information included in the content of an e-mail is displayed, the format of the e-mail is automatically changed to secure the space of the additional information, or a separate window is provided for the information, so the additional information can be conveniently and efficiently provided without hindering use of a general e-mail service.

Also, according to the present invention, when obtaining useful additional information related with the information included in an e-mail, the working time for searching the address list can be significantly reduced, and several steps that have been required are minimized, so it is easy for a user to obtain such information quickly, and the efficiency of resources distribution increases because more computer resources and network resources can be distributed to other works.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing information comprising:
    receiving one or more E-mail content strings;
    analyzing the content strings based on a unit of the content strings based upon an information pattern associated with the unit of the content strings;
    classifying the information pattern based on the analyzed content strings, the classifying being having been defined and authorized by a sender or a receiver of the E-mail;
    identifying one or more additional information related to the E-mail content strings according to the classified information pattern, the identification is performed based on a frequency of an access to the searched identified additional information by the sender or the receiver of the E-mail; and
    selectively outputting the one or more identified additional information in response to detection of a user selection, wherein analyzing the content strings uses analyzing method comprises using a morpheme analyzer or an American Standard Code for Information Interchange (ASCII) code analyzer, wherein the information pattern is classified by using an arrangement of letters of the content strings associated with at least one of a space between the letters, locations and types of the letters, numbers, numbers associated with hyphens, or a special symbol between the letters comprising @.

2. The method of claim 1, wherein identifying one or more additional information related to the Email-content strings is performed based on weather information, calendar information, currency and exchange rate information, and stock price information.

3. The method of claim 1, wherein the additional information is selectively outputted by providing a pop-up menu displayed at a region in response to detection of the user selection to the region associated with one of the content strings.

4. The method of claim 1, wherein the additional information is displayed in response to detection of a mouse pointer being positioned within a region associated with one of the contents string.

5. The method of claim 1, wherein the additional information is hidden in response to detection of a mouse pointer being positioned outside a region associated with one of the contents string.

6. The method of claim 1, wherein the information pattern comprises a name, a title, a unit, an email address, a phone number, a location, a time, a date, or any combination thereof.

7. The method of claim 1, further comprising:
    determining at least one additional information according to a frequency of a prior selection made by the user; and
    outputting at least one additional information.

8. The method of claim 1, wherein the selectively outputting comprises displaying the email content strings to a first window and displaying the additional information to a second window.

9. A method using a processor for providing additional information related to content of an E-mail, the method comprising:
    receiving, via a network, an E-mail comprising at least one additional information related to content string information of the E-mail from a server, wherein the content string information is analyzed according to an information pattern of the content string information, wherein the information pattern is classified based on the analyzed content string information and the classified information pattern is defined and authorized by a sender or a receiver of the E-mail;
    identifying one or more the additional information related to the E-mail according to the classified information pattern, the identification is performed based on a frequency of an access to the identified one or more additional information by the sender or the receiver of the E-mail; and
    selectively outputting the one or more identified additional information in response to detection of a user selection of the content string information, wherein the information pattern is classified by using an arrangement of letters of the content strings associated with at least one of a space between the letters, locations and types of the letters, numbers, numbers associated with hyphens, or a special symbol between the letters comprising @.

10. The method of claim 9, wherein the additional information is outputted by providing a pop-up menu displayed at a region in response to detection of the user selection to the region associated with the content string.

11. The method of claim 9, wherein the additional information is displayed in response to detection of a mouse pointer being positioned within a region associated with the content string.

12. The method of claim 9, wherein the selectively outputting comprises displaying the email to a first window and displaying the additional information to a second window.

13. The method of claim 9, wherein the additional information is hidden in response to detecting of a mouse pointer being positioned outside a region associated with the content string.

14. A system for providing additional information related to content of an E-mail, the system comprising:
  means for receiving E-mails;
  means for analyzing content strings of the E-mails based on a unit of the content strings based upon information patterns associated with the unit of the content;
  means for classifying the information patterns based on the analyzed content strings, the classifying being defined and authorized by a sender or a receiver of the E-mail;
  means for identifying one or more additional information related to the E-mail content strings according to the classified information patterns, the identification is performed based on a frequency of an access to the identified additional information by the sender or the receiver of the E-mail; and
  means for outputting the one or more identified information in response to detection of a user selection, wherein the information pattern is classified by using an arrangement of letters of the content strings associated with at least one of a space between the letters, locations and types of the letters, numbers, numbers associated with hyphens, or a special symbol between the letters comprising @.

15. The system of claim 14, wherein the information patterns comprise a name, a title, a unit, an email address, a phone number, a location, a time, a date, or any combination thereof.

16. A system for providing additional information associated with content of an E-mail, the system comprising:
  a pattern-recognition module coupled to a server having at least one processor and at least one memory comprising computer executable program code running on the server configured to cause the server to analyze content of an E-mail based on a unit of the content, wherein the information patterns are classified based on the analyzed content, wherein the classified information patterns are defined and authorized by a sender or receiver of the E-mail; and
  an information-search module coupled to the server configured to identify additional information related to the Email, the identification is performed according to the classified information patterns and a frequency of an access to the identified additional information by the sender or the receiver of the E-mail, wherein
  the server is configured to provide the additional information, and wherein the information pattern is classified by using an arrangement of letters of the content strings associated with at least one of a space between the letters, locations and types of the letters, numbers, numbers associated with hyphens, or a special symbol between the letters comprising @.

17. The system of claim 16, wherein the information-search module is caused to generate a message requesting the additional information to transmit to a content server that is controlled by the server via a network.

18. The system of claim 16, wherein, the information-search part is caused to select at least one additional information according to a frequency of a prior selection made by a user.

19. The system of claim 16, wherein the server is configured to display of the additional information to the user terminal by linking the additional information with the content strings using Hyper Text Markup Language (HTML) code or Cascading Style Sheets (CSS) code.

* * * * *